2 Sheets--Sheet 2.
J. W. ELLIS.
Turning-Tools.
No. 143,893. Patented Oct. 21, 1873.
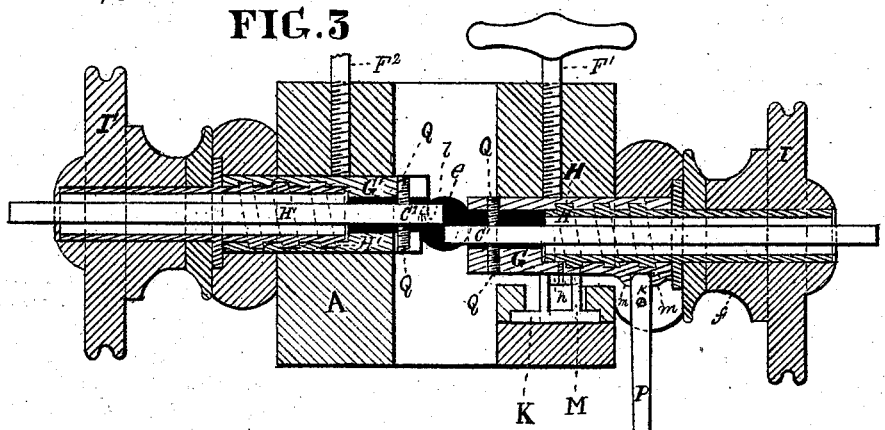
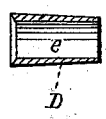
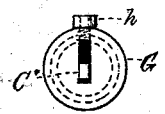
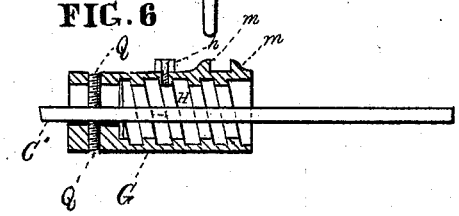
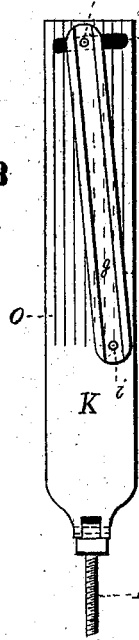
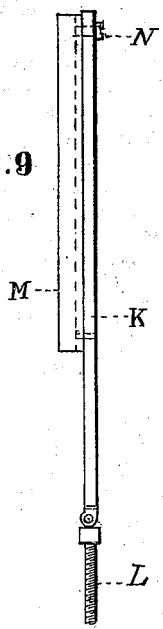
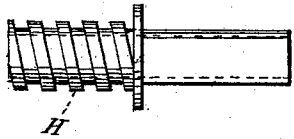
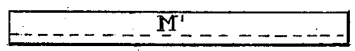
Witnesses
Thomas J. Bewley
William Ellis
Inventor
Joseph W. Ellis
By His Attorney
Stephen Ustick
AM. PHOTO-LITHOGRAPHIC CO. N.Y. (OSBORNE'S PROCESS)

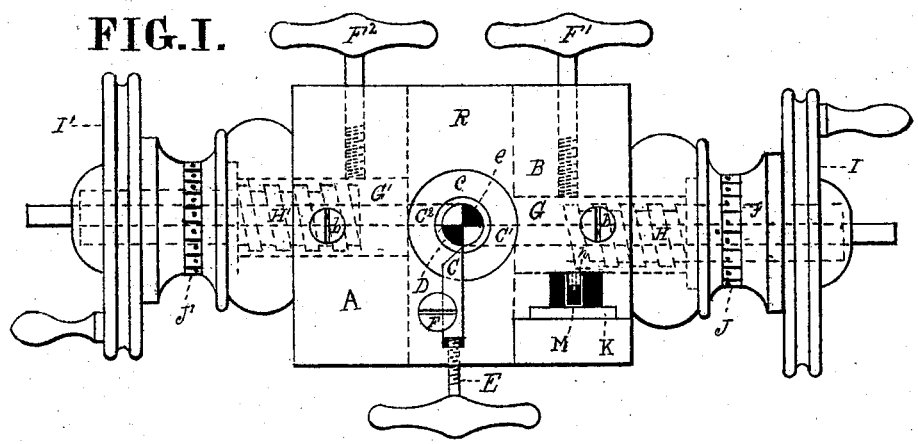
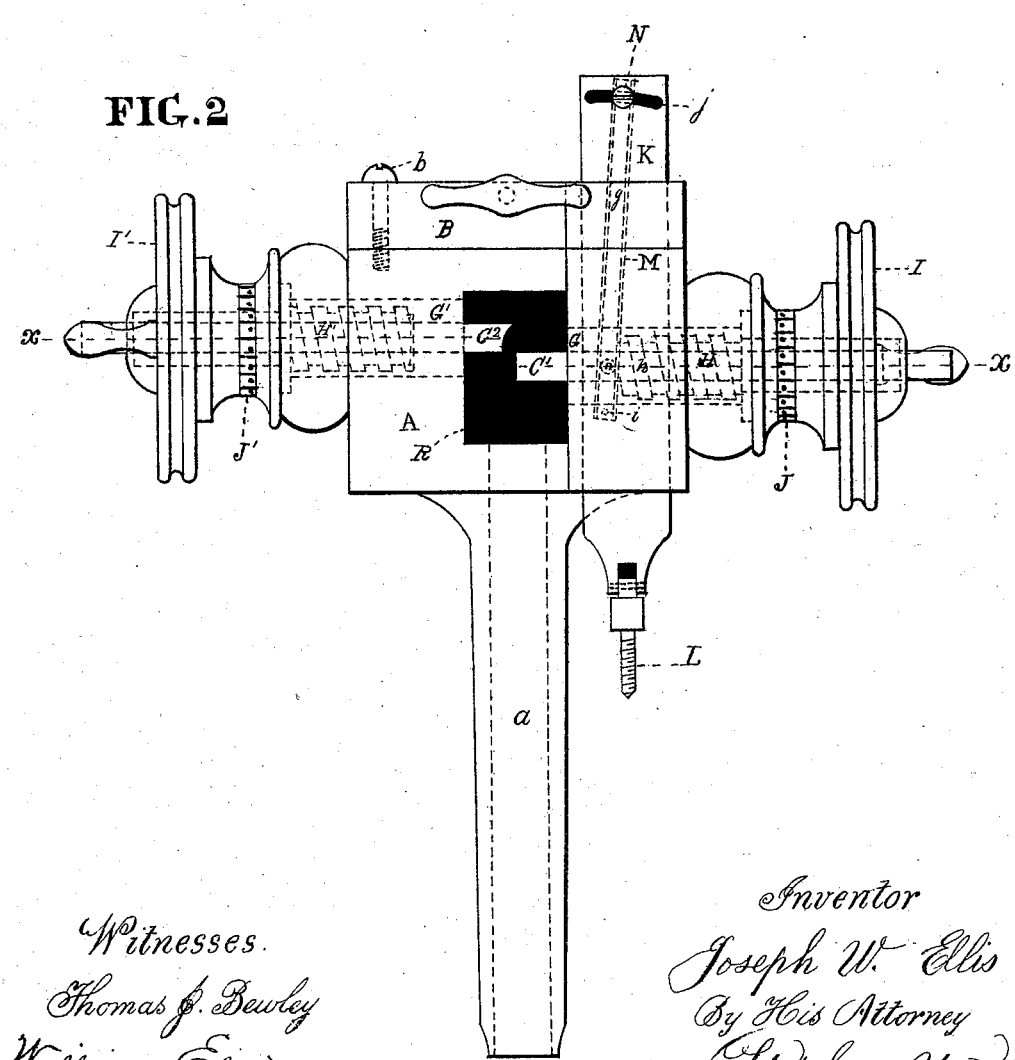

UNITED STATES PATENT OFFICE.

JOSEPH W. ELLIS, OF CAMDEN, NEW JERSEY.

IMPROVEMENT IN TURNING-TOOLS.

Specification forming part of Letters Patent No. 143,893, dated October 21, 1873; application filed June 17, 1873.

*To all whom it may concern:*

Be it known that I, JOSEPH W. ELLIS, of the city and county of Camden and State of New Jersey, have invented a Combination Turning-Tool, of which the following is a specification:

My invention relates to the following particulars: A cutter-stock, provided with a central bore, through which the rod is passed to be turned, is confined to the sliding mandrel of a lathe by means of a central stem, which is fitted to a central bore of the mandrel. The tool automatically centers the rod by means of a countersink to receive its forward end and a cutter, which reduces it to the size of a guiding-bore, through which it passes as the turning tool or cutter is operating upon it, to make it of the desired form and dimensions. To suit various sizes of rods the central bore of the tool is larger than the largest size of rods to be turned, and is provided with detachable bushings of various sizes, to accommodate different sizes of rods to be turned. The cutter last mentioned is secured in the end of a sliding mandrel, adjusted by means of a hand-wheel having a central screw placed at right angles to the line of motion of the rod to be turned, and adjusted for turning a rod, or portion thereof, of equal diameter, the exact size of which is determined by a scale on the hand-wheel. When rods are to be turned tapering, or of any other irregular shape, a form-plate is used for advancing or receding the cutter, the said plate having a pattern to correspond with the form to be turned, the form-plate being arranged and operating as hereinafter described. When the irregularities in the article to be turned are too abrupt to be given by the action of the form-plate alone, a lever is used in connection to give the desired motion to the cutter-mandrel. In this case the central carrying-screw of the mandrel is removed. For turning off rods, or turning annular depressions, a tool is used in the end of a sliding mandrel, arranged and operated in like manner to that of the above-mentioned tool, with the exception of the means employed for producing irregular forms. A scale is also used, in connection with the mandrel, for determining the depth of the groove or other depression.

Figure 1 is an end view of the combined tool. Fig. 2 is a reverse plan or side view of the same. Fig. 3, Sheet No. 2, is a section, at the broken line $x\,x$, of Fig. 2. Fig. 4 is a longitudinal section of the bushing D. Figs. 5 and 6 are an end and longitudinal sections of the sliding mandrel G, having the cutter $C^1$ in connection therewith. Fig. 7 is a side view of the screw H for giving the forward and backward movements of the mandrel G. Figs. 8 and 9 are face and edge views of the form-plate K and strip M. Figs. 10 and 11 are like views of the pattern $M'$.

Like letters in all the figures indicate the same parts.

A is the cutter-stock, provided with a central stem, $a$, to be secured in a central bore of the sliding mandrel of a lathe. The stem is tapered, so as to fit into the corresponding bore of the mandrel. B is a plate on the front end of the stock A, secured by means of screws $b\,b$. It has a countersink, $c$, into which the end of the rod to be turned is placed for the automatic centering of the same, the rod being reduced in its diameter sufficiently to make it perfectly true by means of the cutter C, to fit the bore $e$ of the bushing D. The cutter is adjustable, to give any requisite diameter to the rod to pass through the bushing, by means of the set-screw E, and is confined by the screw F. I employ detachable bushings of various sizes, one of which is represented in Fig. 4, to suit various sizes of the rods to be turned. As the rod passes through the bushing D, the cutter $C^1$ in the inner end of the sliding mandrel G is brought into action, the mandrel being set in the proper position for turning the rod the right diameter by means of the central screw H, operated by the hand-wheel I. The screw is hollow, so as to surround the cutter $C^1$. There being a scale, J, on the hub $f$, to regulate the adjustment of the mandrel, the tool is kept in its adjusted position for turning the rod or portion required of uniform diameter. For turning irregular forms I connect the form-plate K with the stock A and mandrel G, and the head of the lathe, one end of the plate being attached to the head by means of the screw L. The plate remains stationary as the tool and mandrel move forward, so as to give the proper movement to the cutter by means of the groove $g$ of the adjustable strip M and the pin $h$, which projects from the mandrel G, the pin sliding in the groove. The strip is connected with one end of the plate by means of the pivot $i$, and with the other end, so as to adjust it to the proper angle for guiding the mandrel as the sliding mandrel of the lathe advances, by means of the cross-slot $j$ of the plate and confining-screw N, as seen in Fig. 2. There is a scale, O, on the form-plate for regulating the angle of the guiding-strip M. For giving any irregular form other than a taper, patterns are used instead of the strip M. The patterns, corresponding to the form intended to be given to the work, are secured to the form-plate K. A specimen pattern, M', is represented in Figs. 10 and 11. When the irregularities to be turned are too abrupt for the action of the form-plate, the lever P (seen in Fig. 3) is used to assist in giving the forward or backward motion to the cutter-mandrel, the lever being hung on the fulcrum-pin $k$, and its propelling end actuated between the lugs $m\ m$ on the side of the mandrel. When the lever and guide-plate K are used, the central carrying-screw H is removed from its connection with the mandrel. $C^2$ is a tool in the inner end of the sliding mandrel G', which is operated by means of the hand-wheel I' and central screw H', for centering the rod, or for turning annular depressions or projections, or for giving any peculiar form to any part of the rod, the tool being made of corresponding form. In Fig. 2 the cutter $C^2$ is of the form required to turn a quarter-round shoulder or head. It would answer also for cutting off the rod. The hand-wheel I' is provided with a scale, J', like that of the hand-wheel I, to regulate the depth of the cut. The axis of the mandrel G is in the same plane as the center of the bore of the bushing D, and the cutter C is so adjusted as to have its cutting-edge in line therewith. To give accuracy to the adjustment of the tool, there is a vertical shoulder, $l$, on the mandrel G'; to which the edge of the tool is set. The shoulder being central with the mandrel when the tool is set with its flat edge against the flat part or shoulder $l$ of the mandrel, its cutting-edge is consequently on the center of the rod which is being turned. Without this arrangement, when the tool is taken out to be ground and again put in place in the stock A, its cutting-edge is liable to be varied so as to be either above or below the center of the rod, and consequently would vary the diameter of the rod. There are screws Q Q in each of the mandrels G and G', for the adjustment of the cutters $C^1$ and $C^2$. For the purpose of giving a clear view of the tools and work at all times, there is a cross-opening, R, in the cutter-stock A. The screws $F^1$ and $F^2$ are for steadying the mandrels G and G' of the cutter-stock A, to take up the wear of the same and overcome the lost motion. For large work the central stem $a$ is dispensed with.

I claim as my invention—

1. The combination and arrangement, substantially as described, of the bushing D and cutters $C^1$ and $C^2$ with their adjusting mechanism, consisting of the mandrels G G' and screws H H', as and for the purpose set forth.

2. In combination with the cutter $C^1$ and mandrel G, the guide-plate K, provided with a screw, L, as and for the purpose set forth.

3. The central shoulder $l$ on the end of the mandrel G', for the accurate setting of the cutter $C^1$, substantially as described.

4. The lever P, in combination with the stock A, cutter $C^1$, holder G, and form-plate K, substantially as and for the purpose set forth.

5. The combination-tool constructed substantially as described.

JOSEPH WM. ELLIS.

Witnesses:
 THOMAS J. BEWLEY,
 WM. ELLIS.